(12) United States Patent
Singh et al.

(10) Patent No.: US 7,334,202 B1
(45) Date of Patent: Feb. 19, 2008

(54) OPTIMIZING CRITICAL DIMENSION UNIFORMITY UTILIZING A RESIST BAKE PLATE SIMULATOR

(75) Inventors: Bhanwar Singh, Morgan Hill, CA (US); Qiaolin Zhang, Albany, CA (US); Iraj Emami, Austin, TX (US); Joyce S. Oey Hewett, Austin, TX (US); Luigi Capodiece, Santa Cruz, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 371 days.

(21) Appl. No.: 11/145,327

(22) Filed: Jun. 3, 2005

(51) Int. Cl.
*G06F 17/50* (2006.01)
(52) U.S. Cl. .......................................................... 716/4
(58) Field of Classification Search ............ 716/19–21, 716/4
See application file for complete search history.

(56) References Cited

U.S. PATENT DOCUMENTS

| | | | |
|---|---|---|---|
| 6,561,706 B2 * | 5/2003 | Singh et al. | 396/611 |
| 7,010,382 B2 * | 3/2006 | Cheng et al. | 700/121 |
| 7,025,280 B2 * | 4/2006 | Kaushal et al. | 236/16 |
| 2005/0240895 A1 * | 10/2005 | Smith et al. | 716/19 |

* cited by examiner

*Primary Examiner*—Jack Chiang
*Assistant Examiner*—Brandon Bowers
(74) *Attorney, Agent, or Firm*—Amin, Turocy & Calvin, LLP

(57) ABSTRACT

A system for optimizing critical dimension uniformity in semiconductor manufacturing processes is provided. The system comprises a bake plate simulator to model a physical bake plate. A finite element analysis engine uses information from the bake plate simulator to calculate missing information. A lithography simulator predicts outcomes of a lithography process using information from the bake plate simulator and the finite element analysis engine. The system can be used in a predictive capacity or as part of a process control system.

25 Claims, 16 Drawing Sheets

OPTIMIZING CRITICAL DIMENSION UNIFORMITY UTILIZING A RESIST BAKE PLATE SIMULATOR

TECHNICAL FIELD

The present invention generally relates to semiconductor processing, and in particular to a system for regulating post exposure bake time and temperature.

BACKGROUND

The process of manufacturing semiconductors, or integrated circuits (commonly called ICs, or chips), typically consists of more than a hundred steps, during which hundreds of copies of an integrated circuit may be formed on a single wafer. One such step is referred to as a post exposure bake step, which follows a masking step.

The masking step is used to protect one area of the wafer while working on another area. This process is referred to as photolithography or photo-masking. A photo resist, or light-sensitive film, is applied to the wafer, giving it characteristics similar to a piece of photographic paper. Depending on the resist system, post exposure baking may be employed to reduce standing wave effects and/or to thermally catalyze chemical reactions that amplify a latent image. Post exposure baking has been shown to increase linewidth control and resolution. Conventionally, post exposure baking times and/or temperatures have been pre-calculated and/or based on indirect measurements (e.g., concentration of chemicals in vapor retrieved from post exposure bake chamber). Such pre-calculated control parameters and/or indirect measurements may not, therefore, account for wafer-to-wafer variations, variations within a wafer and/or apparatus idiosyncrasies, for example.

In an etching step, the wafer is then "developed" (the exposed photo resist is removed) and baked to harden the remaining photo resist pattern. The temperature at which the wafer is baked, and the period of time for which it is baked affect the critical dimensions of the wafer. The wafer is then exposed to a chemical solution or plasma (gas discharge) so that areas not covered by the hardened photo resist are etched away. The photo resist is removed using additional chemicals or plasma and the wafer is then inspected to ensure the image transfer from the mask to the top layer is correct.

Due to the extremely fine patterns that are exposed on the photo resist, controlling the post exposure bake temperature and the time period over which one or more temperatures are applied during the post exposure bake are significant factors in achieving desired critical dimensions. It has been demonstrated that the post-exposure bake step is important in IC manufacture since it can be employed to activate chemical reactions that catalyze the amplification of an initial UV-light induced latent image. Within-wafer and/or wafer-to-wafer variations during post-exposure bake will contribute significantly to linewidth variation. Thus, maintaining the post exposure bake at a desired temperature, for a desired period of time, may enable uniformity in photo resist hardening and increase the quality of the underlying integrated circuit being manufactured. Small changes in the time and temperature history of the post exposure bake can substantially alter photo resist hardening, resulting in lack of image line control. For example, a few degrees temperature difference and/or an overly long or short post exposure bake time can drastically affect critical dimensions.

To keep processing times under control, sensitive photo resists are employed. A typical highly sensitive photo resist is a chemically amplified photo resist. A chemically amplified photo resist is one in which exposure to actinic radiation produces a catalyst for a reaction that alters the solubility of the resist. A common example is a positive tone resist containing a photo acid generator that generates an acid catalyst on exposure to actinic radiation. The photo-generated acid may catalyze a deprotection reaction that increases the solubility of the photo resist in an aqueous base.

A post exposure baking (PEB) step can be employed to cause the photo-generated catalyst to diffuse and react within the photo resist coating. The PEB step has a significant effect on the quality of pattern transfer. If the PEB step is too long, or if the resist is overheated, then the catalyst can migrate outside of the exposed portion of the resist into surrounding unexposed areas. If the PEB step is too short or the resist is under heated, diffusion and reaction of the catalyst may be unduly limited resulting in an inadequate solubility contrast between exposed and unexposed regions of the photo resist.

Time and temperature are related in the post exposure bake process. For example, higher temperatures may cause faster baking and subsequently faster hardening, while lower temperatures may cause slower baking and correspondingly slower hardening. Ideally, all portions of a wafer would bake and harden at precisely the same rate when subjected to identical temperatures for identical times. Unfortunately, such uniform baking and hardening does not always occur, with different wafer portions baking and hardening at different rates. For example, the center of a wafer may bake and harden at a different rate than the edge of a wafer. Thus, an efficient system and/or method to monitor the post exposure bake and hardening process, and to control post exposure baking time and temperature, is desired to increase fidelity in image transfer.

SUMMARY OF THE INVENTION

The present invention provides for a system and method that facilitates uniform heating of photoresist formed on a semiconductor substrate (e.g., wafer). One aspect of the invention provides a system that simulates the operation of a bake plate. That system is configured to accept user bake plate settings and employ user or other data relating to critical dimension metrology and post exposure bake temperature metrology, along with information relating to lithographic processes and an optimization function, to create a temperature distribution and a critical dimension distribution.

Another aspect of the invention uses data related to critical dimension metrology and accesses information relating to lithographic processes and an optimization function, to optimize bake plate settings. An across-wafer post exposure bake temperature change is calculated that can be used to control the bake plate to attempt to achieve an optimal across-wafer critical dimension distribution.

Yet another aspect of the invention involves the control of lithographic processes in semiconductor manufacturing to optimize critical dimension uniformity. In accordance with this aspect, critical dimension metrology data is accessed by a simulation module. The simulation module contains sub-modules including a finite element analysis module to calculate an optimization function, a bake plate simulator to model a physical bake plate, and a lithography emulator to emulate lithographic processes. The simulator uses these submodules to backward-calculate bake plate settings that will optimize critical dimension uniformity.

DETAILED DESCRIPTION

Figure 1:
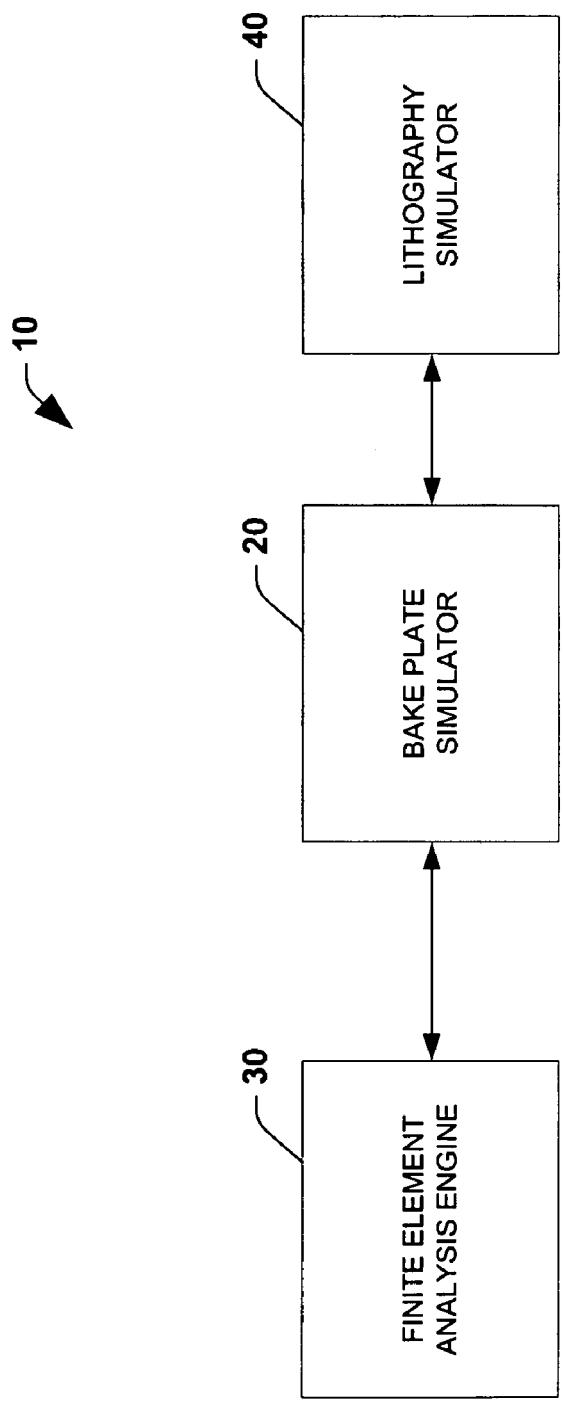
FIG. 1 is system block diagram of a bake plate simulation module in accordance with one aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed.

Figure 13:
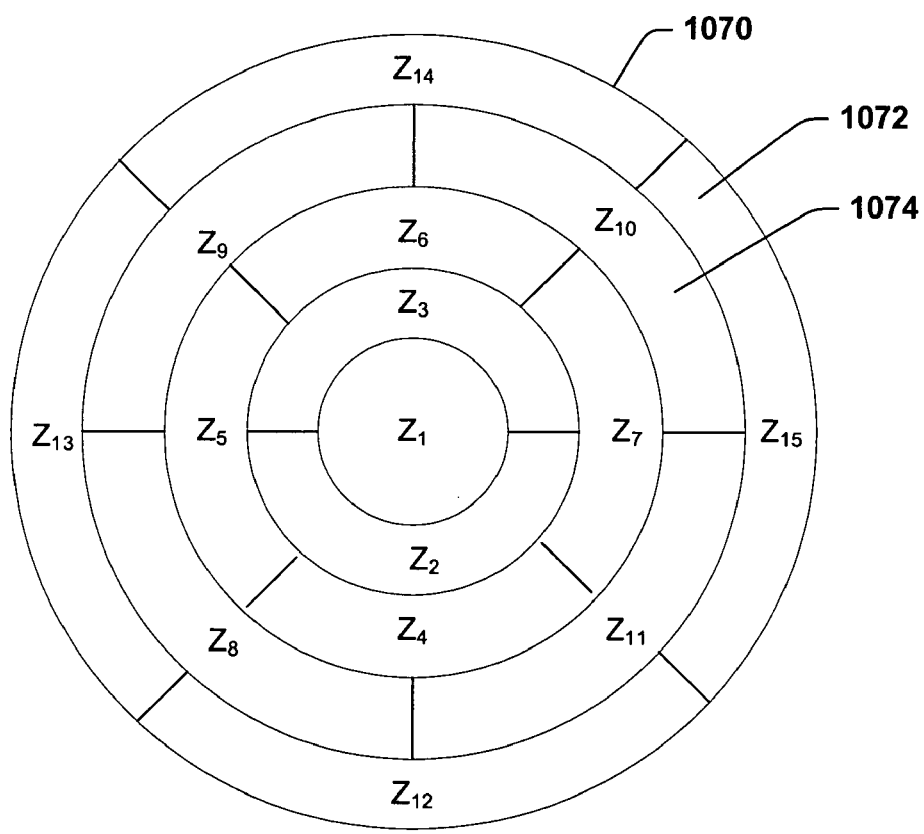
FIG. 13 is an overhead view of a multi-zone bake plate.

FIG. 1 depicts three components of a bake plate simulation module 10 that employs a bake plate simulator 20. The bake plate simulator 20 is or incorporates a model of a physical bake plate used in a semiconductor manufacturing process. This model may be relatively simple, such as a set of temperature readings, or sophisticated, such as with a set of complex mathematical formulae or data structures. Of course, the substance of possible models is not limited to those specific examples provided. One possible implementation may include representations of the thermal and other characteristics of the bake plate such as size and shape. In some of the examples that follow, a multi-zone bake plate such as the one depicted in FIG. 13 is used. Skilled artisans will recognize that any suitable bake plate may be used and modeled.

The bake plate simulator 20 interacts with a finite element analysis engine 30. The finite element analysis engine 30 uses information from the bake plate simulator 20 to calculate a two-dimensional steady-state heat diffusion equation.

Typically, a backwards calculation will be performed by using known values and solving the equation for unknown values. One suitable equation for use with a multi-zone bake plate is:

$$\frac{\partial}{\partial x} k \frac{\partial T}{\partial x} + \frac{\partial}{\partial y} k \frac{\partial T}{\partial y} + S_i h_i (T\ T_a) = 0$$

where k is thermal conductivity, T is temperature, $S_i$ is heating power of the $i^{th}$ zone of a plurality of zones, $h_i$ is an effective convection coefficient of the $i^{th}$ zone, and Ta is the ambient temperature.

A lithography simulator 40 also interacts with the bake plate simulator 20 as well as the finite element analysis engine 30. The lithography simulator 40 uses information from the bake plate simulator 20 and the finite element analysis engine 30 to calculate expected outcomes for various steps in lithographic processes used during semiconductor manufacturing. Instead of a lithography emulator, a reference library including critical dimension to temperature data for at least the lithography process in question may be employed in its place. In that case, another component, such as the bake plate simulator 20, could be employed to perform any actual calculations necessary.

Figure 2:
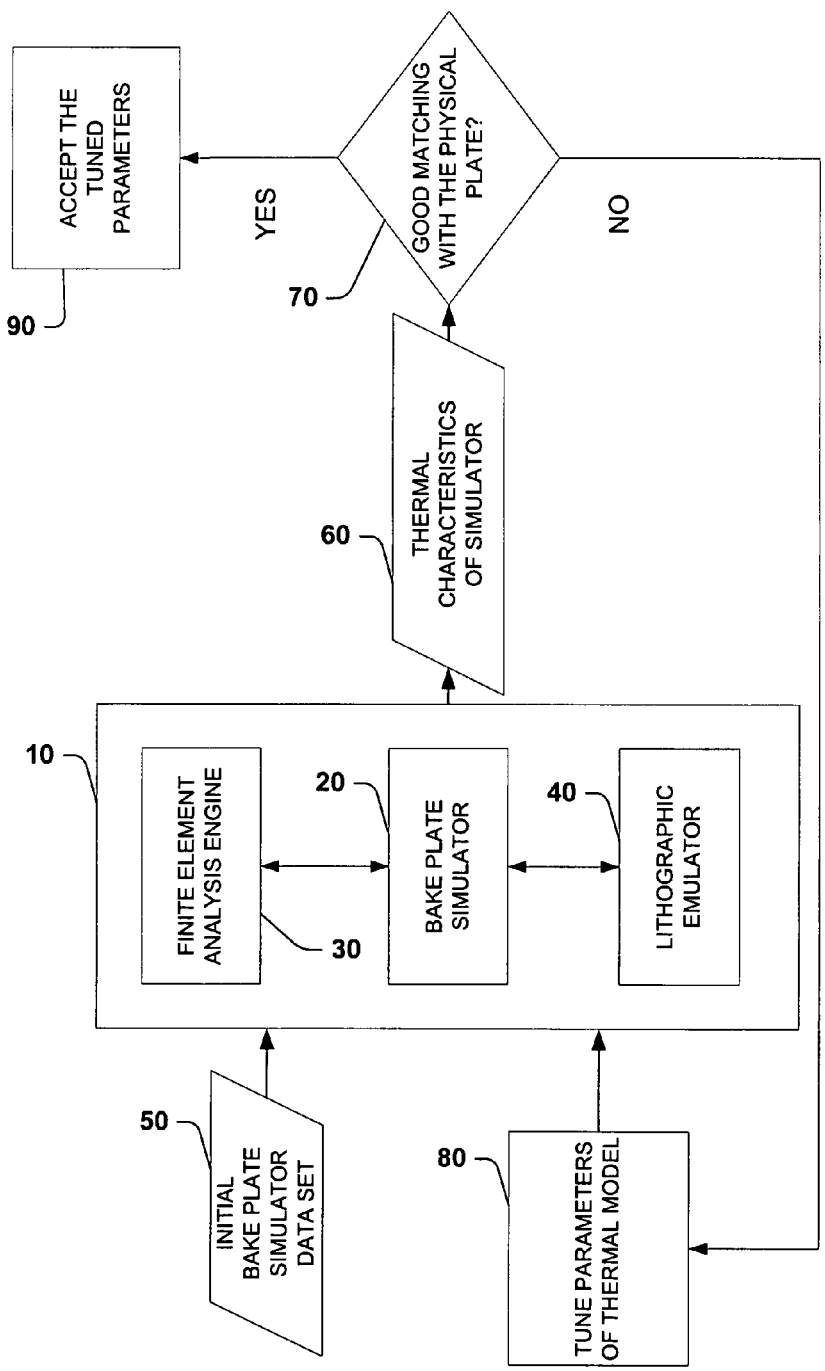
FIG. 2 is data flow diagram depicting a calibration or tuning process that may be employed with the invention.

In some aspects of the invention, including aspects in which the invention is being used to influence manufacturing processes, it is desirable for the bake plate to be as accurate a representation as possible of a physical bake plate. Toward this end, a tuning process is used to adjust a temperature model in the bake plate simulator. Such tuning is depicted in FIG. 2.

Data relating to thermal characteristics of a bake plate are typically obtained using a wireless sensor wafer and collected into an initial data set 50. Information from the data set 50 is then loaded into the bake plate simulation module 10. The bake plate simulation module 10 is then run to output a set of data 60 that represents thermal characteristics of a physical bake plate. The data 60 representing the thermal characteristics of the simulator are then examined at decision block 70 to see if there is a good match with the thermal characteristics of the physical plate. If not, at block 80, parameters of the thermal model are tuned to attempt to compensate for differences and the simulator is run again. This loop will continue until a satisfactory comparison is made at block 70. When good matching is achieved, tuned parameters are accepted at block 90.

Figure 3:
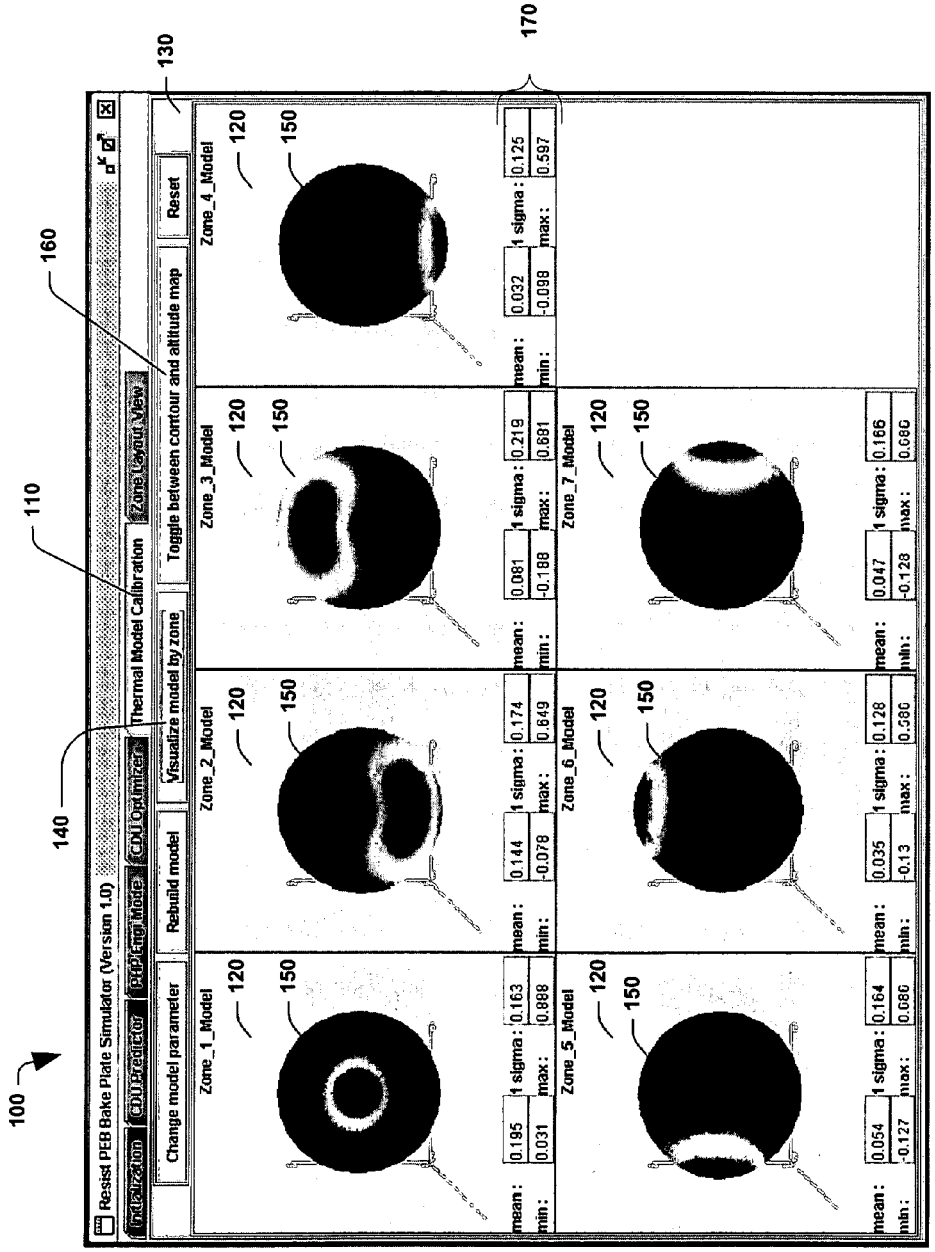
FIG. 3 is view of a graphical user interface for model calibration in accordance with a second aspect of the invention.

FIG. 3 illustrates a sample graphical user interface (GUI) 100 that may be used during the tuning process. This GUI has a tabbed layout and a tab 110 relating to thermal model calibration has been selected. When the selected thermal model calibration tab is active, a set of buttons 130 is visible. As depicted, a button 140 has been selected to cause the GUI to display a plurality of panes 120. Each pane contains a graphic depiction 150 of one zone of a multi-zone bake plate containing seven zones. The specific example depiction is a contour map of thermal gradients. Each graphic depiction 150 is typically color-coded to visually emphasize temperature gradients. By clicking on a second button 160, a user can switch from a contour map representation to an altitude map representation (not shown). Additionally or alternatively, other types of visual representations may be employed. An area 170 at the bottom of each pane displays measurement and statistical information regarding a related zone, including a maximum, minimum, mean, and standard deviation. Other information may be displayed in the area 170 as appropriate or desired.

Figure 4:
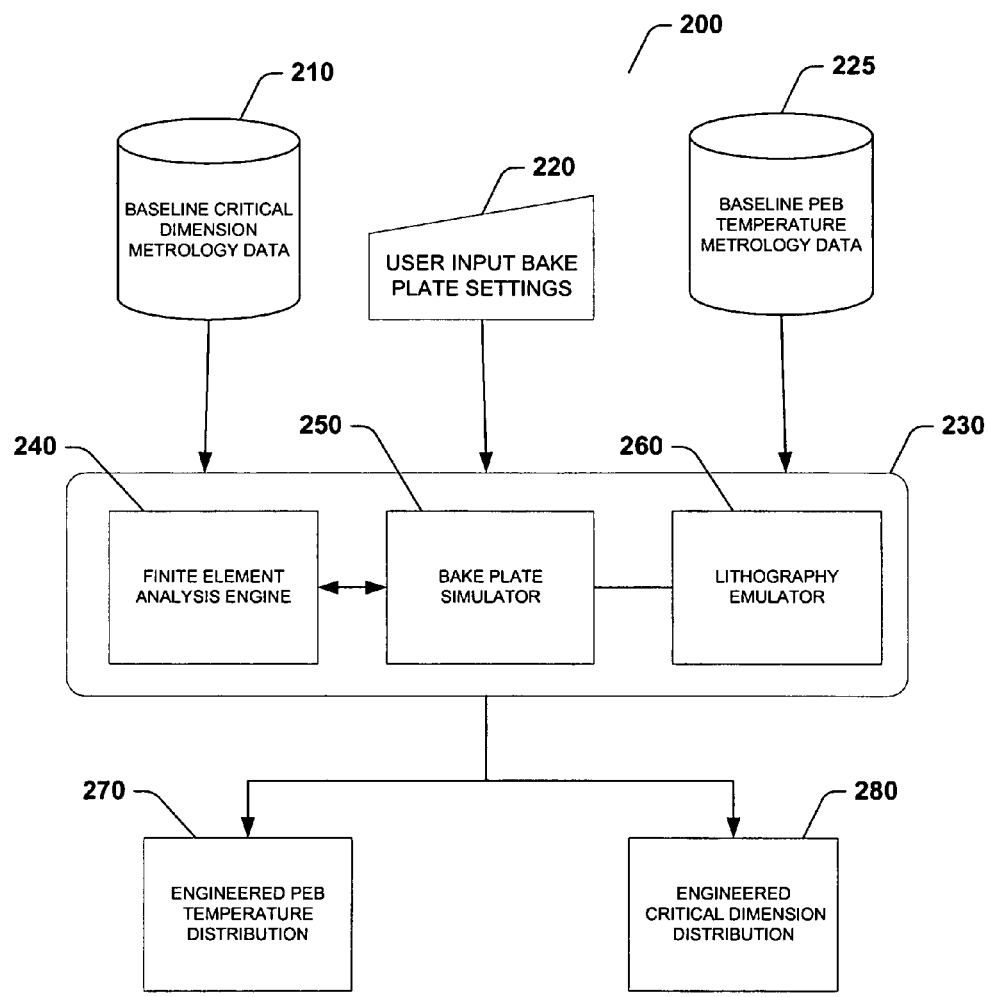
FIG. 4 is a system block diagram of a critical dimension and temperature distribution simulation system in accordance with another aspect of the invention.

Turning now to FIG. 4, in accordance with another aspect of the invention, a bake plate simulation system 200 includes a data store 210 that contains baseline critical dimension metrology data. This data may relate to a silicon wafer currently in production or may be data from an engineering model. The data may be gathered using scatterometry or critical dimension scanning electron microscopy techniques. A data set 220 contains initial bake plate settings input by a user. A second data store 225 contains baseline PEB temperature metrology data. This data can include information gathered during prior manufacturing runs as well as theoretical ideal metrology data. Typically, this data is initially gathered using a wireless sensor wafer.

A bake plate simulation module 230 accesses the initial bake plate settings 220 that were input by the user, along with the baseline critical dimension metrology data from the data store 210 and the baseline PEB temperature metrology data from the data store 225. The module 230 populates a bake plate model of the bake plate simulator 250 with the temperature information. A finite element analysis engine 240 accesses information from the bake plate simulator 250 and performs a backward calculation of a heat diffusion equation to solve for unknown values. A lithography emulator 260 uses information from the finite element analysis engine 240 and the bake plate simulator 250 to derive information regarding a lithography process, typically, behavior of a photoresist during or after a post-exposure baking process. Upon reaching that result, the module creates an engineered post-exposure bake temperature distribution 270 and an engineered critical dimension distribution 280 that represent outcomes of a post-exposure baking process begun with the bake plate settings input by the user.

Figure 5:
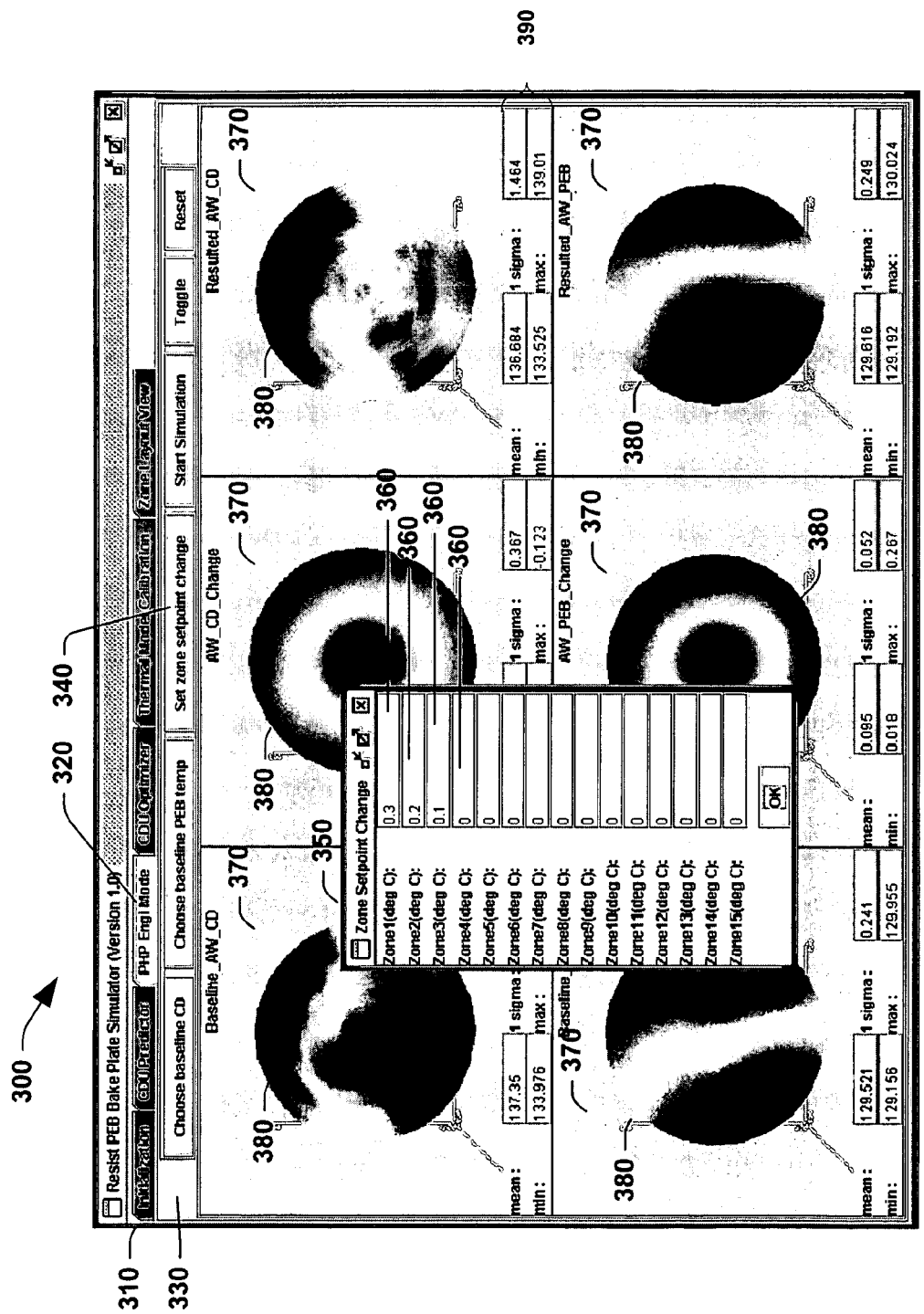
FIG. 5 is view of a graphical user interface for user data input.

FIG. 5 depicts a sample GUI 300 that may be used when operating the module 230 in an engineering or predictive mode to model outcomes of a post-exposure baking process. The GUI 300 includes a tab area 310 including a plurality of tabs that a user can activate to switch among modes of operation. As depicted, a tab 320 is active and indicates that the GUI 300 is operating in engineering mode. A set of buttons 330 related to functions in the selected operation mode is visible. Specifically, button 340 has been selected, which caused a data input window 350 to appear. The data input window 350 includes a plurality of data input areas 360 into which a user may enter a desired value representing an amount by which a zone temperature may be changed. In this example, the data input window 350 is shown as capable of accepting up to fifteen pieces of data, each corresponding to a single zone of a multi-zone bake plate.

Each of a plurality of panes 370 includes a graphical representation 380 of critical dimension variances or post-exposure bake variances. Typically, the graphical representation 380 is color-coded to facilitate human understanding of the data being presented graphically. An area 390 at the bottom of each pane displays measurement and statistical information regarding a related zone, including a maximum, minimum, mean, and standard deviation. Other information may be displayed in the area 390 as appropriate or desired.

Figure 6:
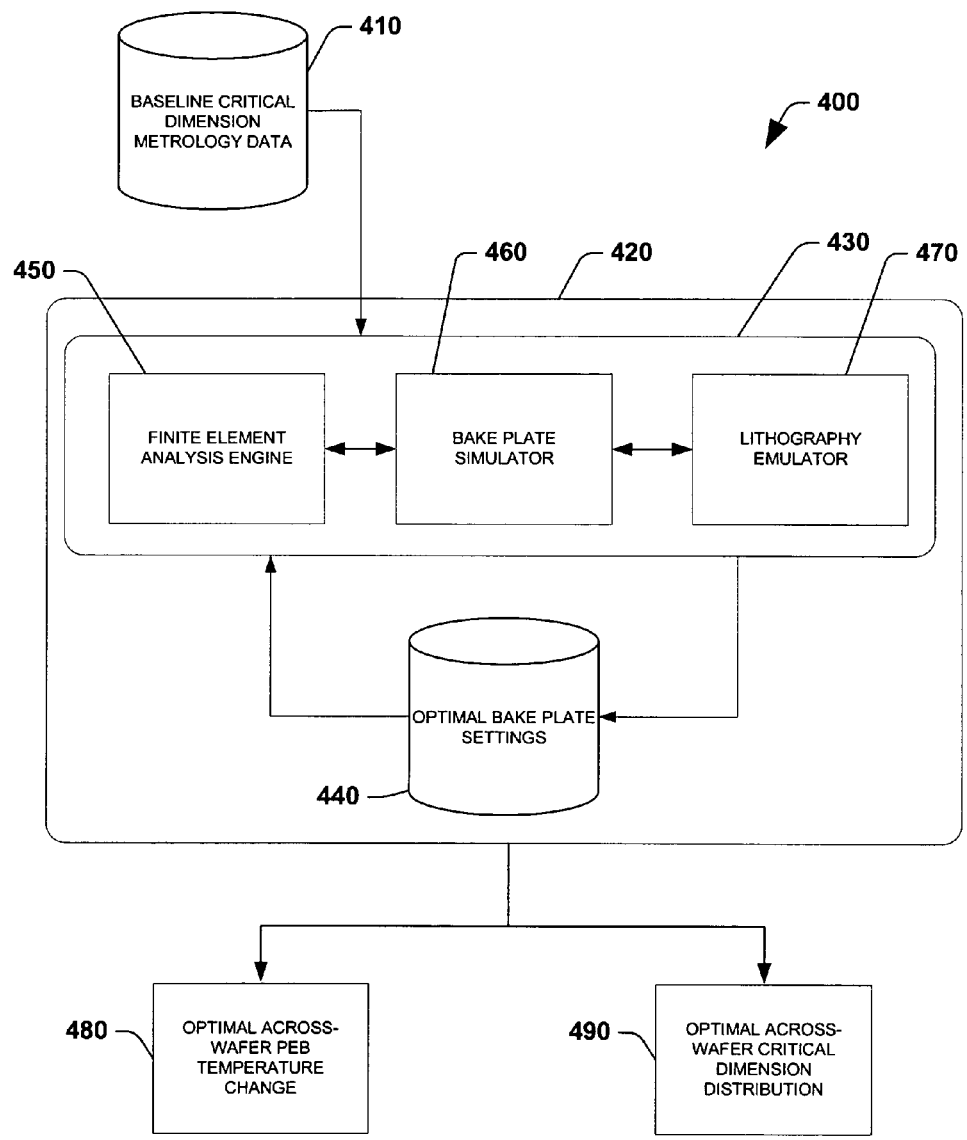
FIG. 6 is a system block diagram of a critical dimension and temperature distribution simulation system in accordance with yet another aspect of the invention.

Yet another aspect of the invention is depicted in FIG. 6. Here, a critical dimension uniformity optimization system 400 is presented. A data store 410 includes baseline critical dimension metrology data, including PEB metrology data as well as metrology data relating to other aspects of a lithography process. A simulation module 420 is coupled to the data store 410 and includes a simulation engine 430 and a data store 440 for optimal bake plate settings. The simulation engine 430 includes a finite element analysis engine 450, a bake plate simulator 460, and a lithography emulator 470.

The simulation module 420 populates a bake plate model of the bake plate simulator 460 with the baseline critical dimension metrology data from the data store 410. A finite element analysis engine 450 accesses information from the bake plate simulator 460 and performs a backward calculation of a heat diffusion equation to solve for unknown values. A lithography emulator 470 uses information from the finite element analysis engine 450 and the bake plate simulator 460 to derive optimal bake plate settings 440. The optimal bake plate settings 440 are then input into the simulation engine 430 and another iteration is performed. Successive iterations are performed until no further improvement can be obtained. The simulation module 420 then outputs an optimal across-wafer PEB temperature change 280 and an optimal across-wafer critical dimension distribution 490.

Figure 7:
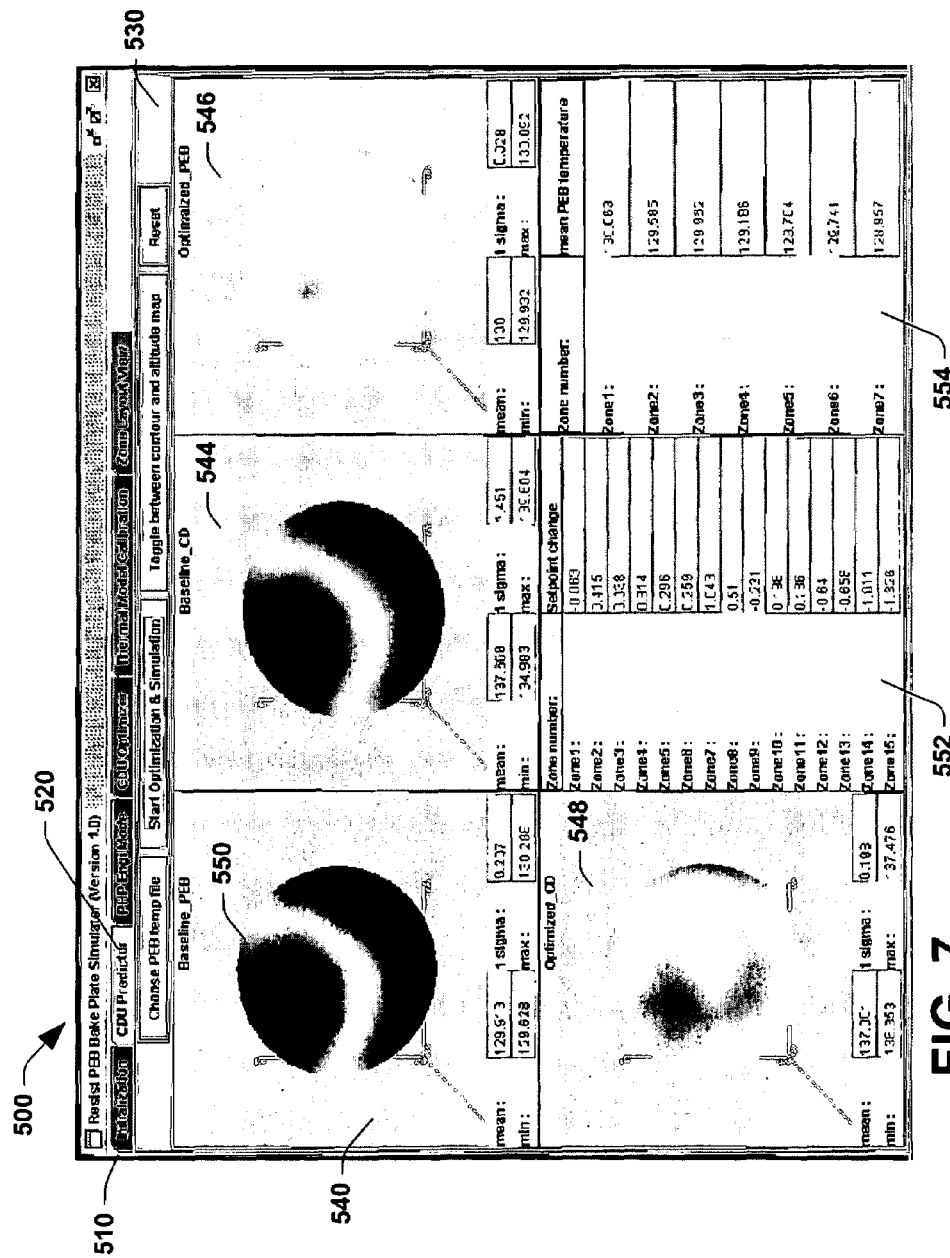
FIG. 7 is view of a graphical user interface for critical dimension prediction.

In still another aspect of the invention, a GUI 500 is presented in FIG. 7. The GUI 500 includes a tab area 510 including a plurality of tabs that a user can activate to switch among modes of operation. As depicted, a tab 520 is active and indicates that the GUI 500 is operating in critical dimension uniformity prediction mode. A set of buttons 530 that are related to functions in the selected operation mode is visible. Various buttons allow the user to choose a PEB temperature file, to start an optimization and simulation run, to toggle between contour and altitude map representations in graphical depictions, and to reset the module.

Each of a plurality of panes 540 includes either a graphical representation 550 of variances or critical dimensions. Typically, the graphical representation 550 is color-coded to facilitate human understanding of the data being presented graphically. Panes 542, 544 include graphical depictions of variations in baseline PEB and baseline critical dimensions, respectively. Panes 546, 548 include graphical depictions of variations in optimized PEB and optimized critical dimensions, respectively. Pane 552 contains a table correlating a zone of a multi-zone bake plate with a value representing a change in temperature setpoint. Pane 554 contains a table correlating a zone of a multi-zone bake plate with a mean PEB temperature of that zone.

Figure 8:
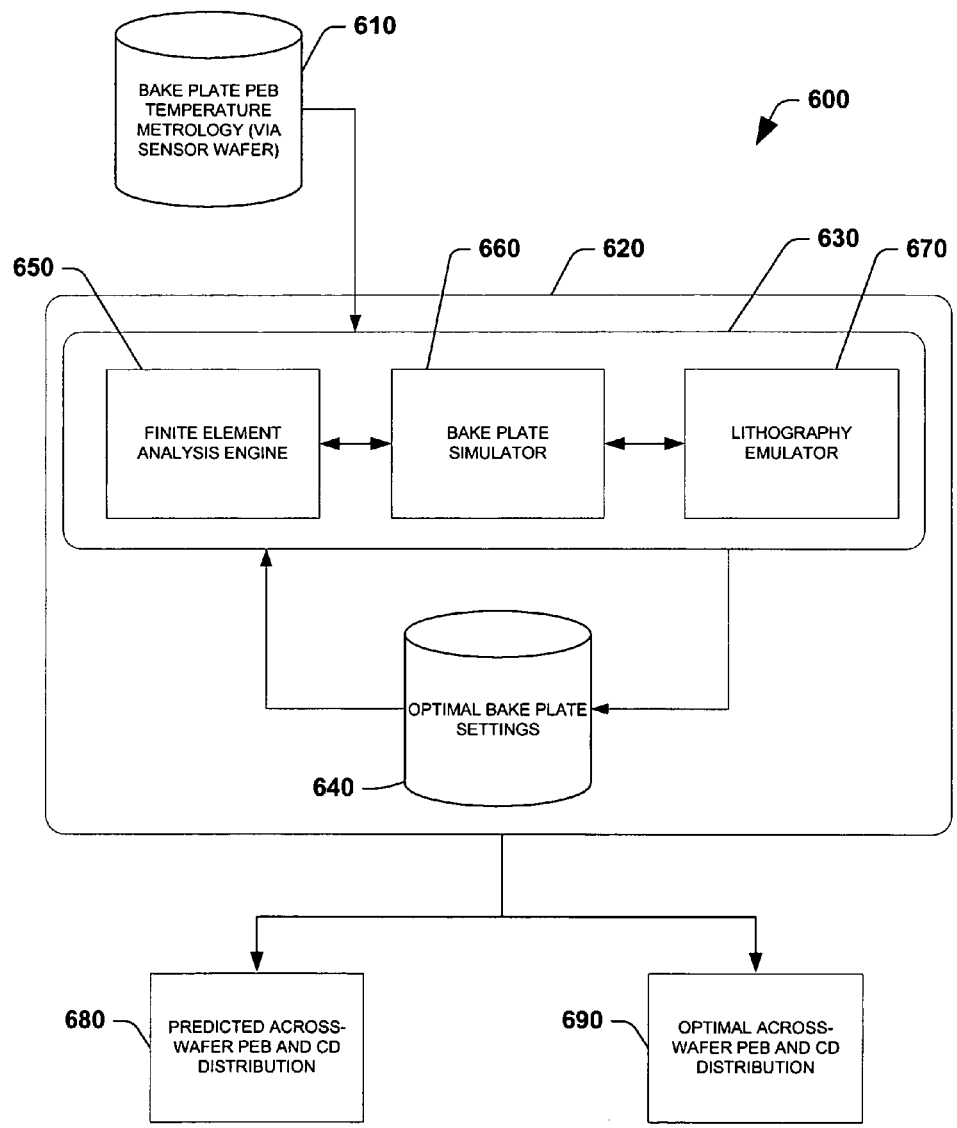
FIG. 8 is a system block diagram of a critical dimension and temperature distribution simulation system in accordance with still another aspect of the invention.

FIG. 8 illustrates an aspect of the invention that involves process control. Here, a critical dimension uniformity optimization system 600 is presented. A data store 610 includes temperature metrology data obtained via a sensor wafer. A simulation module 620 is coupled to the data store 610 and includes a simulation engine 630 and a data store 640 for optimal bake plate settings. The simulation engine 630 includes a finite element analysis engine 650, a bake plate simulator 660, and a lithography emulator 670.

Figure 9:
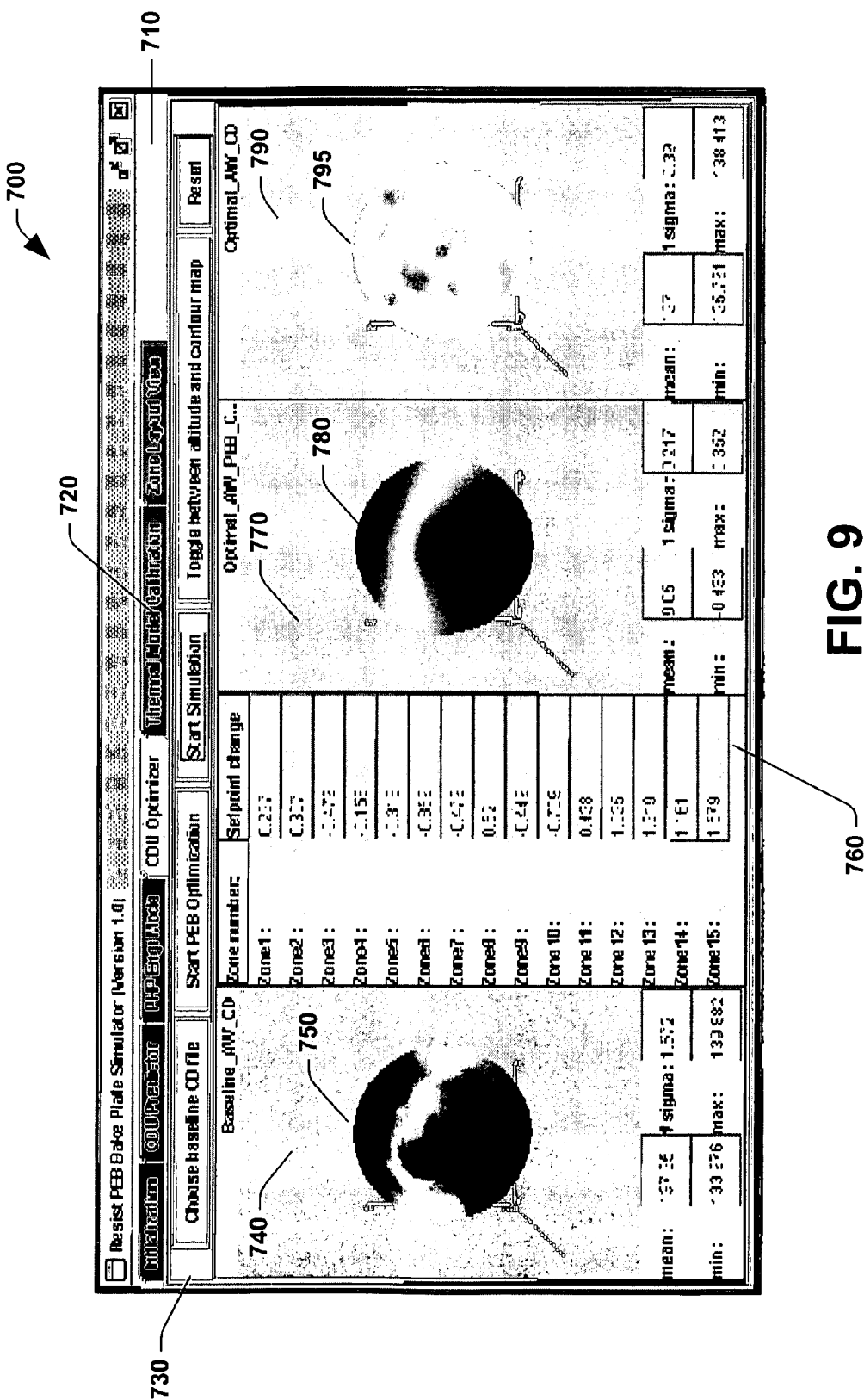
FIG. 9 is view of a graphical user interface for critical dimension optimization.

The simulation module 620 populates a bake plate model of the bake plate simulator 660 with the baseline critical dimension metrology data from the data store 610. A finite element analysis engine 650 accesses information from the bake plate simulator 660 and performs a backward calculation of a heat diffusion equation to solve for unknown values. A lithography emulator 670 uses information from the finite element analysis engine 650 and the bake plate simulator 660 to derive optimal bake plate settings 640. The optimal bake plate settings 640 are then input into the simulation engine 630 and another iteration is performed. Successive iterations are performed until no further improvement can be obtained. The simulation module 620 then outputs a predicted across-wafer critical dimension distribution 680 and an optimal across-wafer PEB and critical dimension distribution 690. Differences between the predicted and optimal distributions can be used to calculate bake plate temperature adjustments to correct process deficiencies and ideally achieve the optimal FIG. 9 depicts a GUI 700 that may be used with another aspect of the invention. The GUI 700 includes a tab area 710 including a plurality of tabs that a user can activate to switch among modes of operation. As depicted, a tab 720 is active and indicates that the GUI 700 is operating in critical dimension uniformity optimization mode. A set of buttons 730 that are related to functions in the selected operation mode is visible. Various buttons allow the user to choose a baseline critical dimension file, to start a PEB optimization, to start a simulation, to toggle between contour and altitude map representations in graphical depictions, and to reset the module. A first pane 740 includes a graphical depiction 750 of baseline across-wafer critical dimensions. A second pane 760 includes a table of zones and setpoint change values for zones of a multi-zone bake plate. A third pane 770 includes a graphical depiction 780 of optimal across-wafer PEB critical dimensions. A fourth pane 790 includes a graphical depiction 795 of optimal across-wafer critical dimensions.

Figure 10:
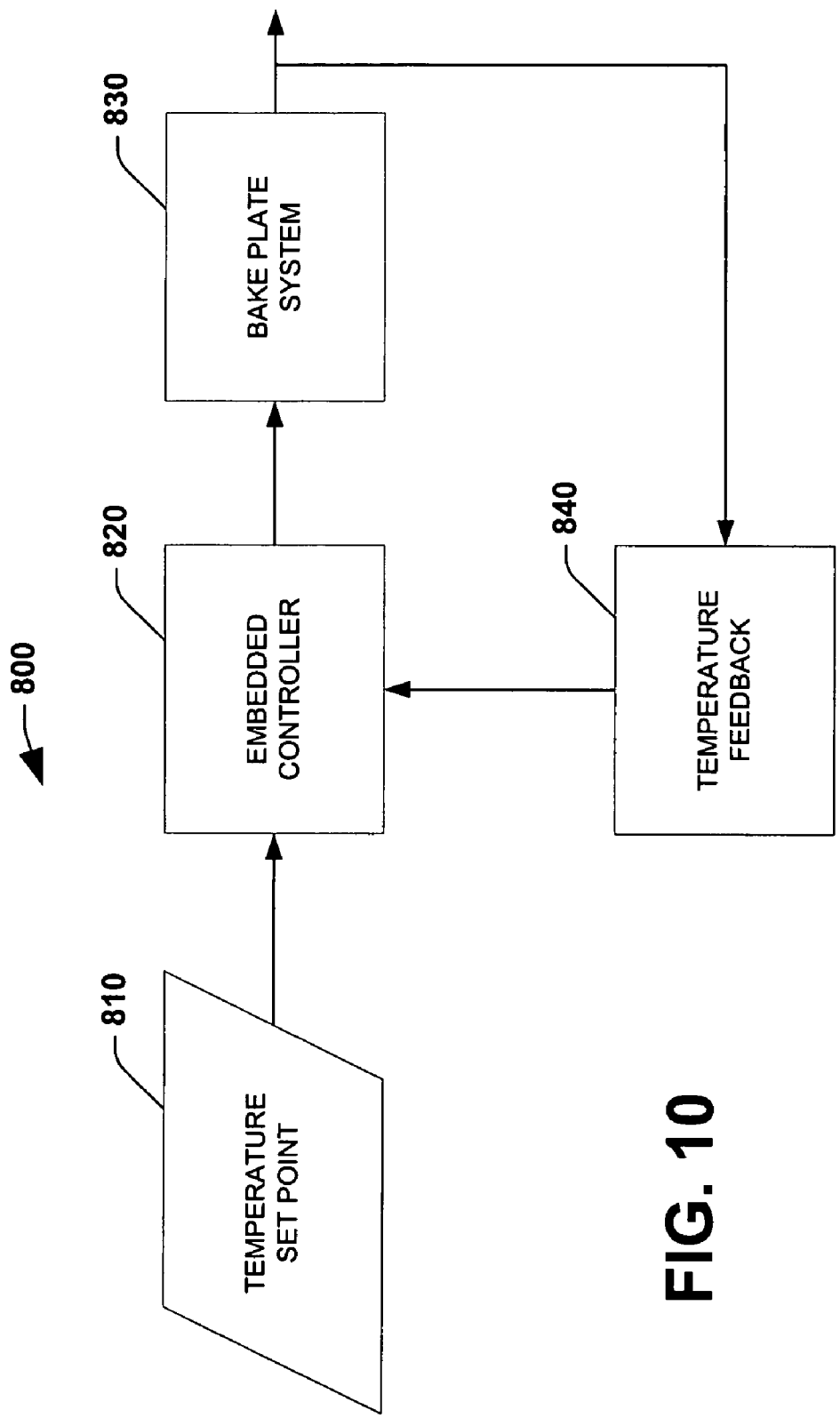
FIG. 10 is a system block diagram of a bake plate control system in accordance with still another aspect of the invention.

FIG. 10 depicts an exemplary bake plate control system 800 with which the invention may be used. An initial temperature set point 810 is supplied to an embedded controller 820. The embedded controller 820 provides temperature adjustment signals to a bake plate system 830. The bake plate system 830 provides process operation data to a variety of components, including a temperature feedback module 840. The temperature feedback module may include an implementation of the invention, which may or may not include appropriate modifications as necessary or desired. The temperature feedback module then provides temperature data to the embedded controller 820, forming a closed-loop system.

Skilled artisans will recognize that the control system depicted in FIG. 10 is an example based upon a single property, temperature, for ease of explanation. It should be appreciated that more complex systems that take into account other properties, including time, fall within the general principles of the disclosed system. Similarly, the general modeling and control concepts disclosed herein can be adapted to other aspects of the semiconductor manufacturing process.

Figure 11:
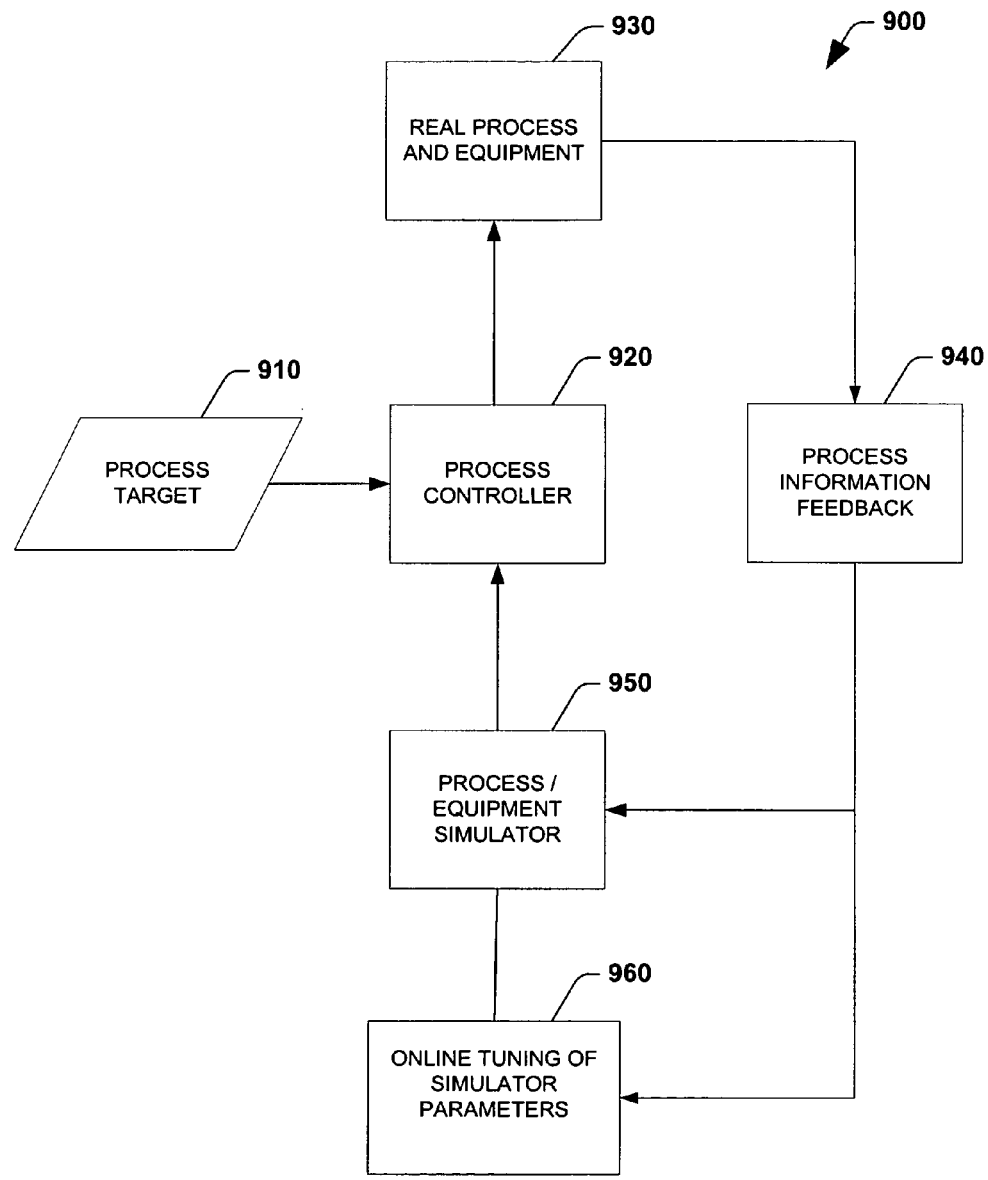
FIG. 11 is a system block diagram of a control system in accordance with another aspect of the invention.

An example is illustrated in FIG. 11. Here, a manufacturing modeling and control process 900 is presented. The manufacturing process to be modeled and controlled may include, for example, etching, chemical mechanical polishing, or rapid thermal processing. A process target 910 represents a desired outcome of the manufacturing process. The target 910 is fed into a process controller 920 that sends control information to real process and equipment 930. Execution of the real process and operation of real equipment creates feedback information that is sent to a process information feedback module 940. The process information feedback module 940 then sends feedback information to a process equipment simulator 950.

The process equipment simulator 950 includes a model of the relevant process and takes into account factors affecting the manufacturing process being modeled. The process equipment simulator can be calibrated using an online tuning module 960 that obtains process feedback information from the process information feedback module 940. The process controller 920 obtains information from the process equipment simulator 950 and uses that information to issue appropriate control signals so that ideally, an actual outcome of the manufacturing process matches the process target.

Figure 12:
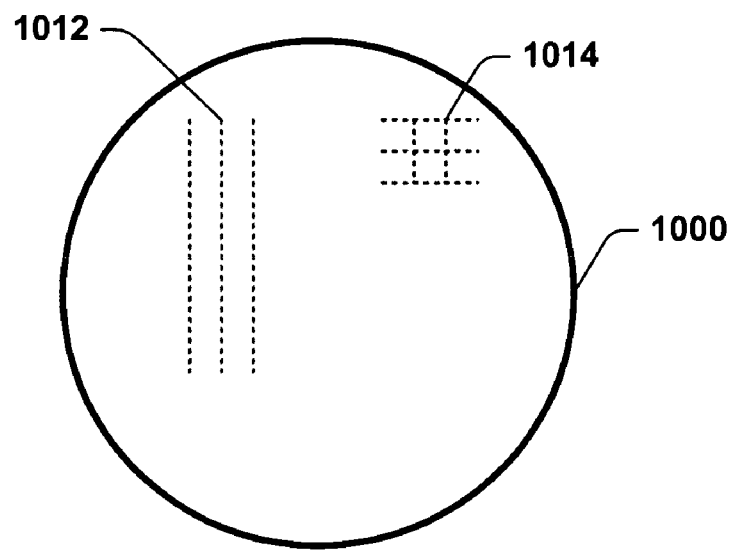
FIG. 12 is an overhead view of a silicon wafer.
Figure 12:
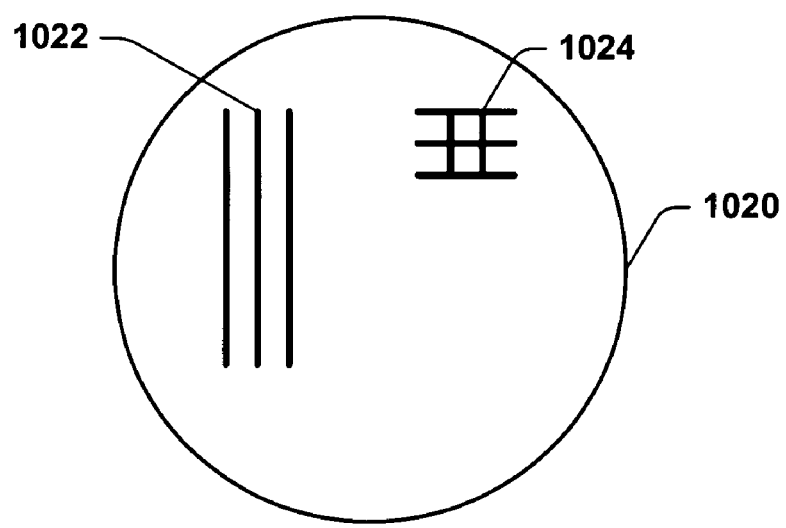

Referring to FIG. 12, a wafer 1000 and a wafer 1020 are illustrated. The wafer 1000 represents a wafer that has lines 1012 and a grating 1014 exposed thereon, and that has been exposed to a first post-exposure baking process. The wafer 1020 represents a wafer that has lines 1022 and a grating 1024 exposed thereon, and that has been exposed to a second post-exposure baking process. By way of illustration, the first baking process may have involved heating the wafer 1000 at a first rate, to a first desired temperature, for a first period of time, while the second baking process may have involved heating the wafer 1020 at a second rate, to a second desired temperature, for a second period of time. Additionally, the wafer 1020 may represent the wafer 1000 at a later point in time in the first baking process. For example, the wafer 1020 may have been heated at the first rate, to the first desired temperature, but may have remained at that first desired temperature for a longer period of time. The difference in the brightness, sharpness, color and shape of the lines on the pattern exposed on the wafer 1000 and the wafer 1020 represent, in an illustrative manner, the effect of time and temperature on the post-exposure baking process.

FIG. 13 depicts a multi-zone bake plate 1070 that may be used with the disclosed invention. The bake plate 1070 includes individually-controllable zones such as zones 1072, 1074. Although the bake plate depicted has a total of 15 zones, it should be appreciated that a greater or lesser of zones may be used.

Figure 14:
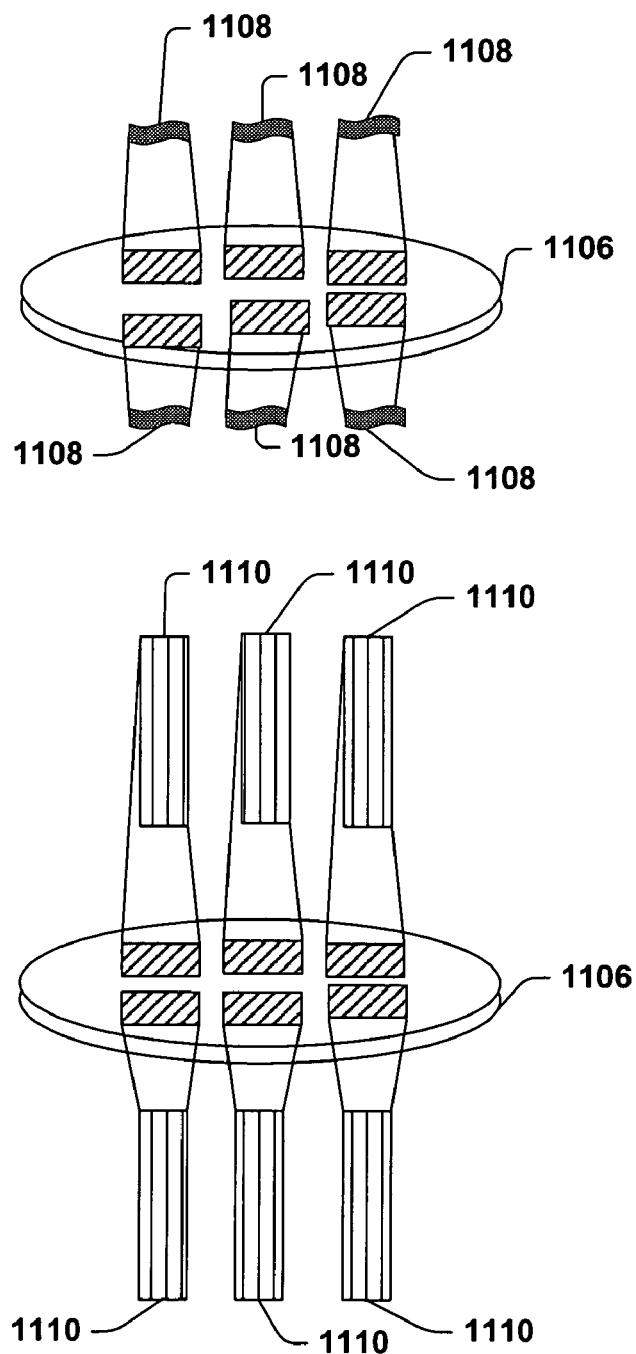
FIG. 14 is a perspective diagram of wafer heating devices.

Turning now to FIG. 14, a wafer 1106 is illustrated being heated by two different methods. While two heating methods are illustrated, it is to be appreciated that any suitable controllable heating methods and/or apparatus may be employed in accordance with the present invention. In one illustration of the wafer 1106 being heated, a plurality of heating coils 1108 are illustrated arranged above and below the wafer 1106, with each heating coil 1108 producing heat that is transmitted to a localized portion of the wafer 1106. It is to be appreciated that while six heating coils 1108 are illustrated, a greater or lesser number of heating coils 1108 may be employed in accordance with the present invention. Similarly, while heating coils 1108 are illustrated above and below the wafer 1106, it is to be appreciated that the coils 1108 may be located at any suitable location in relation to the wafer 1106, in accordance with the present invention.

In another illustration of the wafer 1106 being heated, a plurality of heating lamps 1110 are illustrated arranged above and below the wafer 1106, with each heating lamp 1110 producing heat that is transmitted to a localized portion of the wafer 1106. It is to be appreciated that while six heating lamps 1110 are illustrated, a greater or lesser number of heating lamps 1110 may be employed in accordance with the present invention. Similarly, while heating lamps 1110 are illustrated above and below the wafer 1106, it is to be appreciated that the lamps 1110 may be located at any suitable location in relation to the wafer 1106, in accordance with the present invention.

The present invention facilitates generating feedback information that can be employed to control heaters (e.g., heating coils 1108, heating lamps 1110), to facilitate more precise control of post exposure development processes. By way of illustration, feedback information may be generated that indicates that a first heater should increase the amount of heat it is producing, while a second and third heater should maintain the amount of heat being produced, while a fourth and fifth heater should reduce the amount of heat being produced. Such control facilitates producing more uniformly developed wafers, which can in turn increase chip yield and quality.

Figure 15:
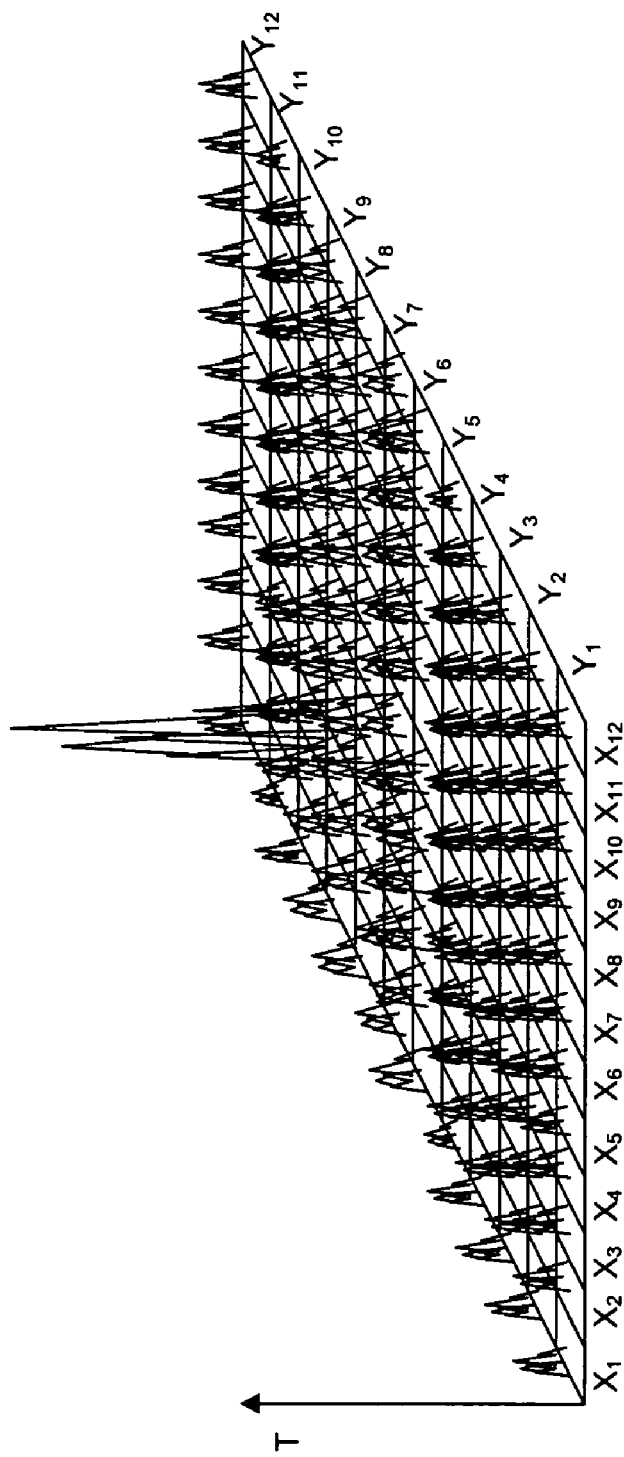
FIG. 15 is a chart depicting temperature variations across a group of zones.

In FIG. 15, zones of a bake plate are mapped onto an exemplary 12 by 12 grid. Each respective portion of the bake plate and thus any substrate or photoresist ($X_1Y_1$ . . . $X_{12}Y_{12}$) is being monitored for temperature by a respective optical fiber, a measuring system and a controller. The temperature amplitude of each portion is shown. As can be seen, the temperature at coordinate $X_7Y_6$ is substantially higher than the temperature of the other portions $X_nY_n$.

Figure 16:
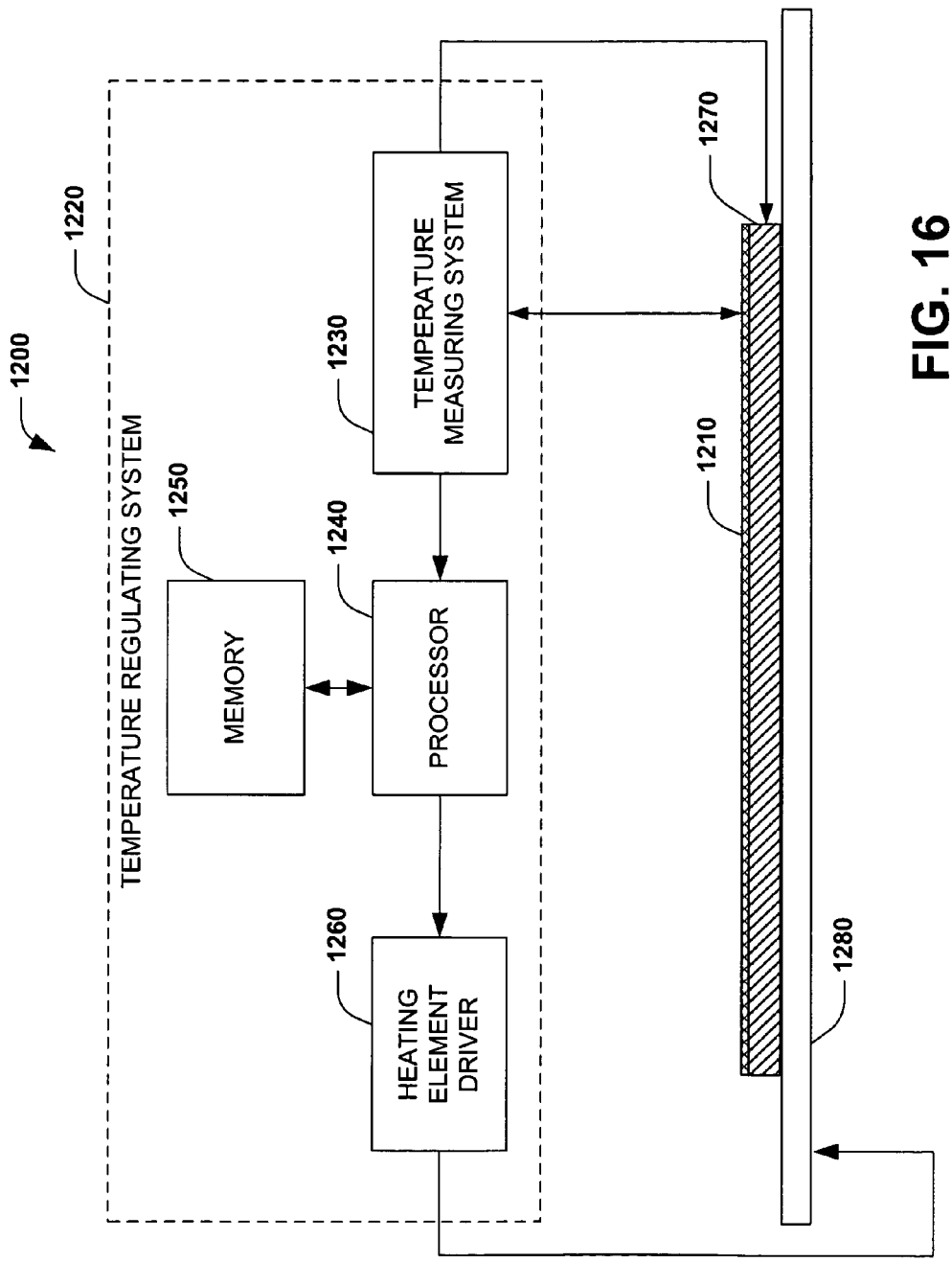
FIG. 16 is a block diagram of a temperature regulating system.

Turning now to FIG. 16, a system 1200 for facilitating uniform heating of the photoresist 1210 is illustrated. A temperature regulating system 1220 can further include a temperature measuring system 1230, a processor 1240, a memory 1250, and a heating element driver 1260. The temperature measuring system 1230 can be any system suitable for measuring temperatures, and will generally include a temperature sensor. It is to be appreciated that the temperature sensor chosen will depend on the particular material being heated, and the desired range of heating temperatures.

The temperature measuring system 1230 measures the temperature of the photoresist 1210 during a heating process in order to facilitate uniform heating of the photoresist 1210. The temperature measuring system 1230 can measure the temperature of the photoresist 1210 and a substrate 1270. It is to be appreciated that the temperature measuring system 1230 can measure the temperature of any suitable component of the system 1200.

The processor 1240 receives the measured data from the temperature measuring system 1230 and determines the temperature of the photoresist 1210. The processor 1240 is operatively coupled to the temperature measuring system 1230 and is programmed to control and operate the various components within the photoresist heating system 1200 in order to carry out the various functions described herein. The processor 1240 can be coupled to a heating element driver 1260, which drives the heat elements 1280. The heating element driver 1260 can be controlled by the processor 1240 so as to selectively vary heat output of various heating elements 1280. The processor (or CPU) 1240 may be any of a plurality of processors, such as the AMD K7 or other similar and compatible processors. The manner in which the processor 1240 can be programmed to carry out the functions relating to the present invention will be readily apparent to those having ordinary skill in the art based on the description provided herein.

A memory 1250, which is operatively coupled to the processor 1240, is also included in the system 1200 and serves to store program code executed by the processor 1240 for carrying out operating functions of the system 1200 as described herein. The memory 1250 may include both read only memory (ROM) and random access memory (RAM). A ROM typically contains, among other code, a Basic Input-Output System (BIOS) that controls basic hardware operations of the system 1200. RAM is the main memory into which an operating system and application programs are usually loaded. The memory 1250 also serves as a temporary storage medium for information such as acceptable temperature tables and other data that may be employed in carrying out the present invention. For mass data storage, the memory 1250 may include a non-volatile storage device such as a hard disk drive (e.g., 10 Gigabyte hard drive) or flash memory. A power supply (not shown) can be utilized to provide operating power to the system 1200. Any suitable power supply (e.g., battery, line power) may be employed to carry out the present invention.

It is to be appreciated that although FIG. 16 is described herein with respect to heating the photoresist 1210, the same figure may be used to represent heating of any other suitable material (e.g., top and bottom anti-reflective coatings, low K dielectric materials, spin-on-glass (SOG) and other spin-on materials) and such materials may be schematically referenced by numeral 1210 of this figure.

It should be appreciated that certain aspects of the disclosed invention are suitable for use in open or closed loop feedback control systems for in situ control or modification of parameters of manufacturing processes. For example, calculated PEB temperature distributions may be compared to measured temperature distributions and appropriate adjustments can be made on the basis of such a comparison. Another example includes the calculation of an across-wafer PEB temperature change that can be used in a feedback loop to automatically adjust baking temperatures as appropriate. It is further possible to use the systems and methods described herein to deliberately introduce variations that may correct or otherwise compensate for variations that occurred earlier in the manufacturing process or are expected to occur later.

The present invention provides for a system and method for heating a photoresist in a substantially uniform manner. As a result, the present invention facilitates improving photoresist integrity and reliability which in turn afford for increases in quality of image transfer in lithographic processes employing a photoresist heated in accordance with the present invention.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims

What is claimed is:

1. A system for optimizing critical dimension uniformity in semiconductor manufacturing processes, comprising:
   a bake plate simulator that includes a thermal model of a bake plate;
   a finite element analysis engine that accesses data from the thermal model and calculates a heat diffusion equation wherein the heat diffusion equation differentiates temperature with respect to at least two spatial coordinates of a zone; and
   a lithography simulator that uses calculation results from the finite element analysis engine to derive predicted results of a lithographic process.

2. The system of claim 1, wherein the thermal model is a model of a multi-zone bake plate.

3. The system of claim 2, wherein the heat diffusion equation is a two-dimensional steady state heat diffusion equation.

4. The system of claim 3, wherein the heat diffusion equation is:

$$\frac{\partial}{\partial x}\left(k\frac{\partial T}{\partial x}\right) + \frac{\partial}{\partial y}\left(k\frac{\partial T}{\partial y}\right) + S_i - h_i(T - T_a) = 0$$

where k is thermal conductivity, T is temperature, $S_i$ is heating power of an $i^{th}$ zone of a plurality of zones, $h_i$ is an effective convection coefficient of the $i^{th}$ zone, and $T_a$ is the ambient temperature.

5. The system of claim 1, further comprising a controller that adjusts a lithography process based at least in part upon predicted results from the lithography simulator.

6. The system of claim 5, further comprising a graphical user interface that accepts user input for system components.

7. The system of claim 6, wherein the graphical user interface includes graphical representations of critical dimension information.

8. The system of claim 7, wherein the graphical user interface includes contour map representations and altitude map representations of temperature information in graphical depictions.

9. The system of claim 6, wherein the graphical user interface includes contour map representations and altitude map representations of temperature information in graphical depictions.

10. A system for optimizing critical dimension uniformity in semiconductor manufacturing processes, comprising:
a module configured to accept user input in the form of bake plate settings;
a memory containing critical dimension metrology data and post-exposure bake temperature data therein; and
a simulation engine that uses a bake plate simulator, a finite element analysis that calculates a heat diffusion equation wherein the heat diffusion equation differentiates temperature with respect to at least two spatial coordinates of a zone, and a lithography simulator to calculate a post-exposure temperature distribution and a critical dimension distribution.

11. The system of claim 10, wherein the lithography simulator is a data library.

12. The system of claim 11, wherein the data library is a data storeselected from the group consisting of a relational database, an object-oriented database, a data definition file, an extensible markup language file, and a text file.

13. The system of claim 10, wherein the finite element analysis engine calculates a solution for a two-dimensional heat diffusion equation.

14. The system of claim 13, wherein the two-dimensional heat diffusion equation is:

$$\frac{\partial}{\partial x}\left(k\frac{\partial T}{\partial x}\right) + \frac{\partial}{\partial y}\left(k\frac{\partial T}{\partial y}\right) + S_i - h_i(T - T_a) = 0$$

where k is thermal conductivity, T is temperature, $S_i$ is heating power of an $i^{th}$ zone of a plurality of zones, $h_i$ is an effective convection coefficient of the $i^{th}$ zone, and $T_a$ is the ambient temperature.

15. The system of claim 10, further comprising a tuning module for adjusting parameters of the bake plate simulator.

16. A method for predicting post-exposure bake results in a semiconductor manufacturing process, comprising:
simulating parameters of a bake plate;
using the simulated parameters to calculate missing parameters in a heat diffusion equation wherein the heat diffusion equation differentiates temperature with respect to at least two spatial coordinates of a zone; and
using the simulated parameters and calculated parameters to predict a resulting critical dimension distribution.

17. The method of claim 16, further comprising:
calibrating simulated parameters based upon bake plate measurements.

18. The method of claim 17, further comprising:
using the critical dimension distribution to calculate a post-exposure bake temperature distribution.

19. The method of claim 18, further comprising:
using the post-exposure bake temperature distribution to adjust bake plate settings.

20. The method of claim 16, further comprising:
creating a graphical representation of the critical dimension distribution.

21. A system for predicting post-exposure bake results in a semiconductor manufacturing process, comprising:
means for simulating parameters of a bake plate;
means for using the simulated parameters to calculate missing parameters in a heat diffusion equation wherein the heat diffusion equation differentiates temperature with respect to at least two spatial coordinates of a zone; and
means for using the simulated parameters and calculated parameters, to predict a resulting critical dimension distribution.

22. The system of claim 21, further comprising:
means for calibrating simulated parameters based upon bake plate measurements.

23. The system of claim 22, further comprising:
means for using the critical dimension distribution to calculate a post-exposure bake temperature distribution.

24. The system of claim 23, further comprising:
means for using the post-exposure bake temperature distribution to adjust bake plate settings.

25. The system of claim 21, further comprising:
means for creating a graphical representation of the critical dimension distribution.

* * * * *